United States Patent
Walsh et al.

(10) Patent No.: US 9,302,584 B2
(45) Date of Patent: Apr. 5, 2016

(54) DROWSY DRIVER PREVENTION SYSTEMS AND METHODS

(71) Applicant: Verizon Patent and Licensing Inc., Arlington, VA (US)

(72) Inventors: Jeffrey M. Walsh, Verona, NJ (US); Woo Beum Lee, Basking Ridge, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 66 days.

(21) Appl. No.: 14/467,971

(22) Filed: Aug. 25, 2014

(65) Prior Publication Data

US 2016/0052391 A1 Feb. 25, 2016

(51) Int. Cl.
*G08B 23/00* (2006.01)
*B60K 28/06* (2006.01)
*G08B 21/06* (2006.01)

(52) U.S. Cl.
CPC .............. *B60K 28/066* (2013.01); *G08B 21/06* (2013.01)

(58) Field of Classification Search
CPC .................................. G08B 21/06; G06F 9/54
USPC ........... 340/575, 576, 438, 439, 545.4, 932.2, 340/945, 970
See application file for complete search history.

(56) References Cited

U.S. PATENT DOCUMENTS

| | | | | |
|---|---|---|---|---|
| 4,836,219 A | * | 6/1989 | Hobson | A61B 5/1103 340/575 |
| 5,581,239 A | * | 12/1996 | Lin | G08B 21/06 340/575 |
| 6,057,768 A | * | 5/2000 | Barnoach | G08B 21/06 340/407.1 |
| 6,067,020 A | * | 5/2000 | Wimmer | G08B 21/06 340/391.1 |
| 6,154,141 A | * | 11/2000 | Prater | G08B 21/06 340/439 |
| 8,957,779 B2 | * | 2/2015 | Wu | G08B 21/06 340/575 |

* cited by examiner

*Primary Examiner* — Tai T Nguyen

(57) ABSTRACT

A user device may be used to prevent a driver of a vehicle from driving while drowsy. The user device may create a driver profile for the driver and collect driving data while the driver is driving the vehicle. The driver profile may include information regarding the driver's propensity to drive while drowsy and the driving data may include information regarding whether the driver is exhibiting drowsy behaviors and how long the driver has been driving continuously. The user device may determine whether the driver is drowsy based on the driver profile and the driving data, and may respond in one or more ways, such as by altering the driver with an audio signal, providing the driver with a map to a nearby rest area, activating a braking system of the vehicle, warning nearby drivers about the driver being drowsy, contacting a parent or guardian of the driver, etc.

20 Claims, 12 Drawing Sheets

DROWSY DRIVER PREVENTION SYSTEMS AND METHODS

BACKGROUND

Cars, trucks, trains, and other types of vehicles are a ubiquitous feature of modern society because of the significant social and economic benefits that they provide. However, the use of such vehicles can pose a danger to people and property when operated under dangerous conditions, such as when a driver of a vehicle has become drowsy from lack of sleep, from ingesting an intoxicating substance, etc.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide techniques for preventing a driver of a vehicle (e.g., a car, a truck, a bus, etc.) from driving while drowsy. Information, such as movements of the drivers head, the amount of time the driver has been driving continuously, and other types of information may be gathered and analyzed to determine whether the driver is drowsy, and a response may be executed to prevent the driver from driving while drowsy, such as alerting the driver with an audio signal, providing directions to a nearby rest stop, activating a braking system of the vehicle, activating an assisted driving mode of the vehicle (e.g., where the vehicle is capable of driving on its own), contacting a guardian of the driver, an employer of the driver, and/or law enforcement, etc.

Figure 1:
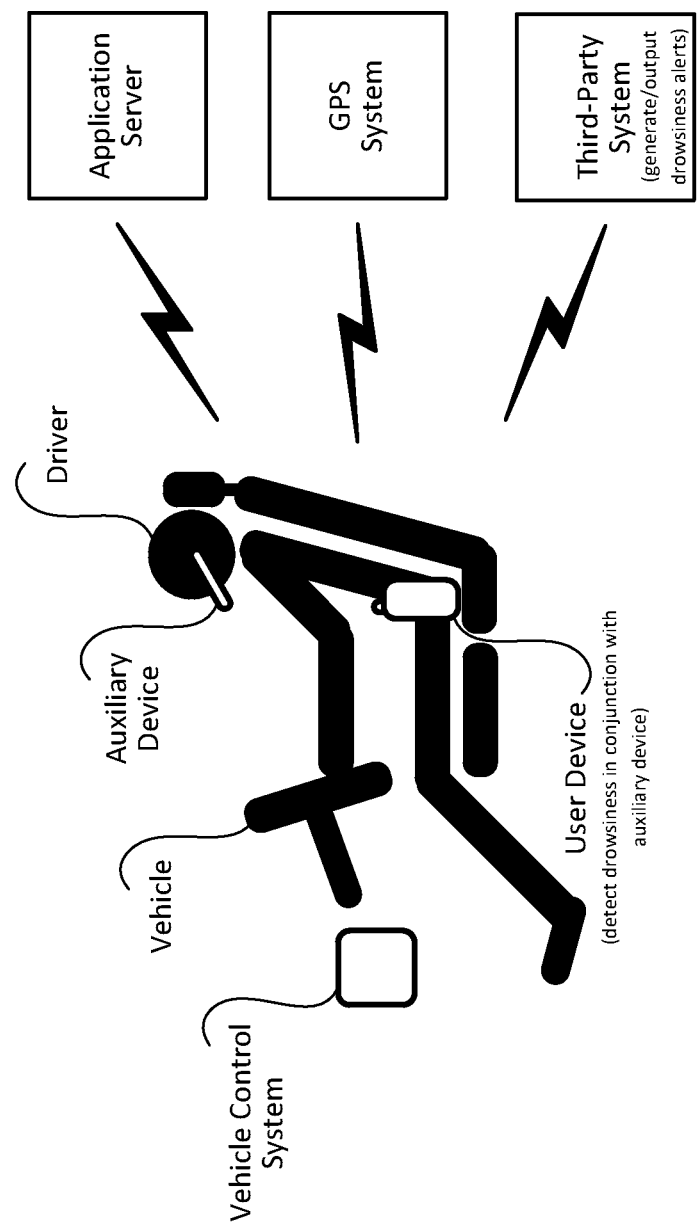
FIG. 1 illustrates an example overview of an implementation described herein.

FIG. 1 illustrates an example overview of an implementation described herein. As shown in FIG. 1, a driver of a vehicle may have a user device (e.g., a smartphone, a tablet computer, etc.) that is connected to an auxiliary device (e.g., a Bluetooth headset). The user device may create a user profile for the driver, which may include receiving profile information directly from the driver and/or communicating with the application server to obtain profile information. The user profile may include information indicating whether the driver is likely to driver while drowsy, what types of conditions (e.g., particular routes, times of day, days of the week, etc.) tend to contribute to the driver being drowsy, what types of behaviors (e.g., certain head movements) the driver may tend to exhibit while drowsy, etc. The user profile may be associated with the driver and/or may include information on one or more other drivers.

The user device may collect driving data as the driver drives the vehicle. For instance, the user device may communicate with a global positioning system (GPS) determine how long the driver has been driving and may communicate with the auxiliary device (which may include an accelerometer) to determine whether the driver is exhibiting drowsy behaviors (e.g., bobbing of the driver's head). Additionally, or alternatively, the user device may analyze the user profile and/or driving data to determine whether the driver is drowsy. For instance, if the driver has a history of driving while drowsy, has been driving a relatively long time, and is exhibiting head movements consistent with falling asleep (i.e., as measured by the accelerometer of the auxiliary device), the user device may determine that the driver is drowsy.

The user device may respond to a driver being drowsy in one or more of a variety of ways to prevent the driver from continuing to drive while drowsy. For example, the user device may play an alarm, a message, or another type of audio prompt to the driver via the auxiliary device, activate a radio or sound system of the vehicle, provide the driver with directions to a nearby rest stop, communicate with the vehicle control system (e.g., to activate a braking system of the vehicle, activate assisted driving functions of the vehicle, etc.), communicate with one or more third-party systems to alert nearby drivers that a drowsy driver is in the area, contact a parent, guardian, or emergency contact of the driver, contact an employer of the driver, contact local law enforcement, etc. As such, the user device may be used to gather information about a driver, analyze the information to determine whether the driver is drowsy, and prevent the driver from continuing to drive while drowsy.

Figure 2:
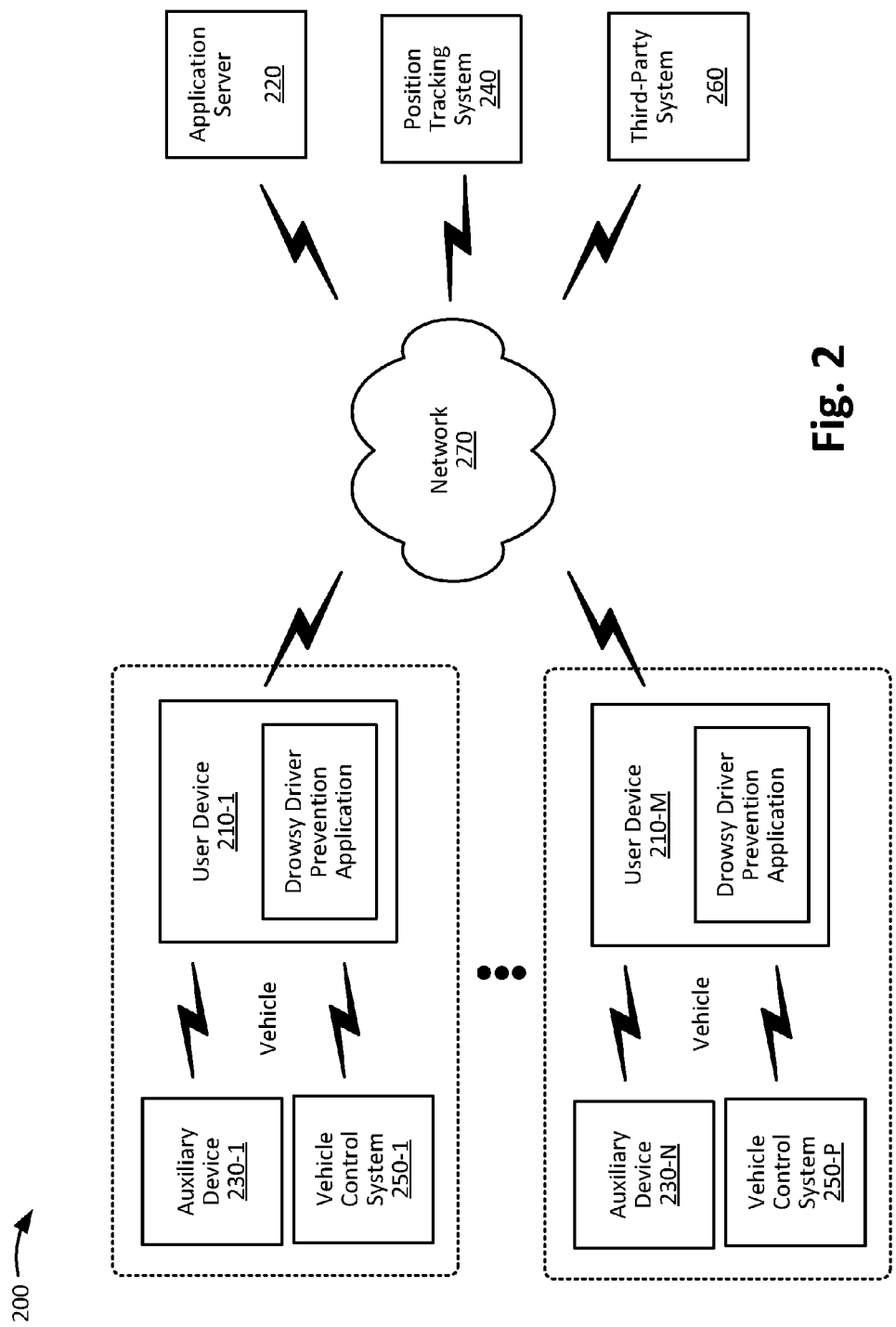
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1 through 210-M (where M is an integer greater than or equal to 1), application server 220, auxiliary devices 230-1 through 230-N (where N is an integer greater than or equal to 1), position tracking system 240, vehicle control systems 250-1 through 250-P (where P is an integer greater than or equal to 1), third-party system 260, and network 270.

User device 210 may include a device capable of communicating via a network, such as network 270. For example, user device 210 may correspond to a mobile communication device (e.g., a smartphone, or a personal digital assistant (PDA)), a portable computer device (e.g., a laptop computer, a tablet computer, a wearable computer), and/or another type of device. In some implementations, user device 210 may display text, display graphics, produce audio signals, and/or produce control signals, etc.

As depicted, user device 210 may include a drowsy driver prevention application installed on a memory device of user device 210. The drowsy driver prevention application may enable user device 210 to perform one or more of the operations described herein, such as creating a driver profile based on information received from a driver and/or from application server 220, collecting driving data by communicating with auxiliary device 230 and/or position tracking system 240, analyzing driving data to determine whether a driver is drowsy, and/or responding to the analysis of driving data by prompting the driver to stay awake, communicating with vehicle control system 250 to communicate with the vehicle to control driving functions (e.g., activate a braking system of the vehicle, turn off an engine (not shown) of the vehicle, etc.), providing directions to a nearby rest stop, warning drivers of other vehicles that the driver is drowsy, contacting a guardian of the driver, contacting an employer of the driver, contacting local law enforcement, etc.

Application server 220 may include one or more computing devices, such as a server device or a collection of server devices. Application server 220 may operate as an application server for the drowsy driver prevention application of user device 210. In some implementations, application server 220 may send profile information (e.g., identification information, application preferences, driver behavior information, etc.) to user device 210 to assist user device 210 in creating and/or enhancing a driver profile. Additionally, or alternatively, application server 220 may receive profile information from user device 210 and, for example, use the profile information to develop a profile for one or more analogous drivers. Application server 210 may receive profile information from one or more other devices as well, such as from a desktop computer (not shown) being operated by a third party (e.g., a guardian or employer of the driver) to create and/or modify the diver profile for the driver. In some implementations, application server 220 may operate as a portal for a third party to exercise one or more controls over the vehicle (possibly via user device 210 and vehicle control system 250), such as activating a braking system of the vehicle, creating an audio signal via a radio of the vehicle, turning off the engine of the vehicle, etc.

Auxiliary device 230 may include a device capable of communicating with user device 210. For example, auxiliary device 230 may include a wired or wireless headset (e.g., a Bluetooth headset) with a speaker and microphone for enabling communication between the driver and user device 210. Auxiliary device 230 may also include a device for monitoring movements of the driver within the vehicle, such as an accelerometer capable of detecting angular movements of the head and neck of the driver. Auxiliary device 230 may also, or alternatively, be capable of communicating with user device 210 in such a way so as to enable user device 210 to determine changes in a distance between user device 210 and auxiliary device 230 (e.g., based on a relative signal strength of a wireless signal between user device 210 and auxiliary device 230).

Position tracking system 240 may include one or more computing devices, such as a server device or a collection of server devices capable of determining changes is location of user device 210. In some implementations, position tracking system 240 may include a GPS system and/or one or more other types of wireless systems capable of tacking the geographical movements of user device 210. Position tracking system 240 may be integrated into user device 210 and/or the vehicle. As mentioned above, position tracking system 240 may assist user device 210 in determining certain driving conditions, such as how long a driver has been continuously driving. In some implementations, a positing tracking system of the vehicle may be used to provide user device 210 with the geographical movements of user device 210.

Vehicle control system 250 may include one or more computing devices within the vehicle. In some implementations, vehicle control system 250 may include a device capable of controlling one or more functions of the vehicle, such as the braking system of the vehicle, the engine of the vehicle (e.g., whether the engine is on or off), a dashboard lighting system within the vehicle, a radio or other type of media system within the vehicle, a steering system, etc. Vehicle control system 250 may be capable of communicating with user device 210 to prevent a driver from driving while drowsy by activating the braking system, turning the engine of the vehicle off, toggling the dashboard lighting system on and off or changing the lighting and/or color configuration of the dashboard lighting system, activating the radio or other media system, or by controlling one or more other systems with the vehicle.

Network 270 may include one or more wired and/or wireless networks. For example, network 270 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 270 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment is not limited to what is shown in FIG. 2. In practice, environment 200 may include additional devices and/or networks, fewer devices and/or networks, different devices and/or networks, or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
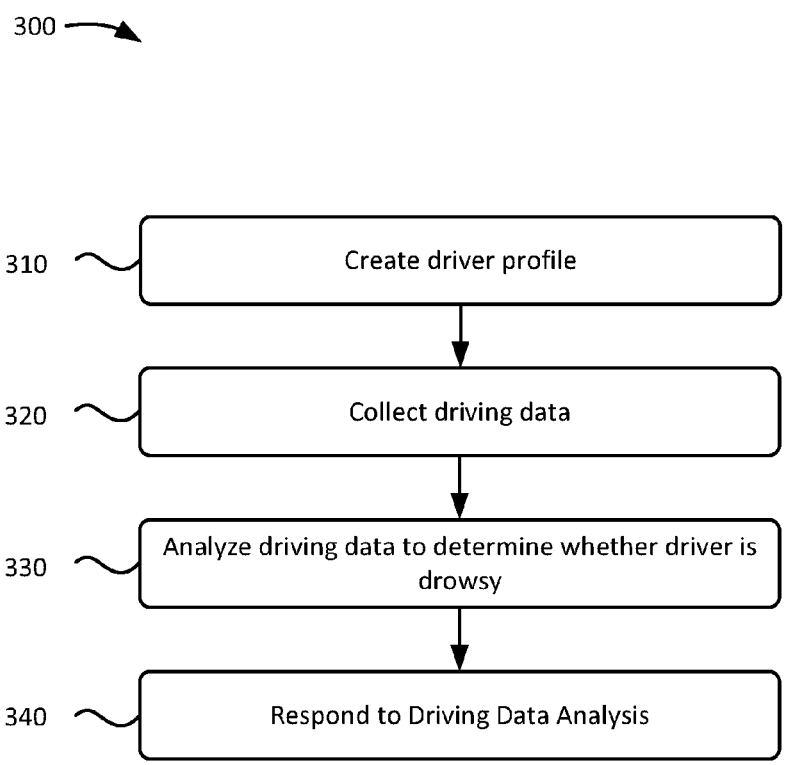
FIG. 3 illustrates a flowchart of an example process for preventing drowsy driving.

FIG. 3 illustrates a flowchart of an example process 300 for preventing drowsy driving. In some implementations, process 300 may be performed by user device 210 (e.g., by the drowsy driver prevention application). In some implementations, some or all of the blocks of process 300 may be performed by one or more other devices. For instance, some or all of the blocks of process 300 may performed by user device 210. A description of FIG. 3 is provided below with reference to FIGS. 4-8, which provide examples of the operations presented in FIG. 3.

As shown in FIG. 3, process 300 may include creating a driver profile (block 310). For example, user device 210 may create a driver profile. In some implementations, user device 210 may create the driver profile based on profile information received from one or more sources, such as a user (also referred to herein as a "driver") of user device 210 and/or from application server 220. Profile information may include one or more types of information, such as identification information (e.g., a name of the driver, an age of the driver, etc.), vehicle information (e.g., vehicle make, vehicle model, vehicle identification number (VIN), etc.), contact information (e.g., a telephone number, an email address, a home address, etc.), medical conditions (e.g., narcolepsy), medications that a driver may be taking (e.g., sleep aids, pain medication, cough medicine, etc.), occupation, work hours, and/or application preferences information (e.g., one or more application settings that the driver may prefer to have enabled or disabled).

Additionally, or alternatively, profile information may include response information, such as how user device 210 should respond to a driver that is drowsy (e.g., by playing back a recorded message, contacting a guardian, contacting an employer, activating a braking system of the vehicle, etc.), driver behavior information (e.g., times of day when a driver often drives a vehicle, distances and durations that a driver may commonly drive, instances of drowsy driving for a driver, physical movement patterns of a driver's body while driving a vehicle, music or other forms of media that are commonly played while a driver is driving a vehicle, etc.), and/or analogous driver information (e.g., profile information relating to other drivers that are determined to be analogous to the user of user device 210 in one or more ways).

Figure 4:
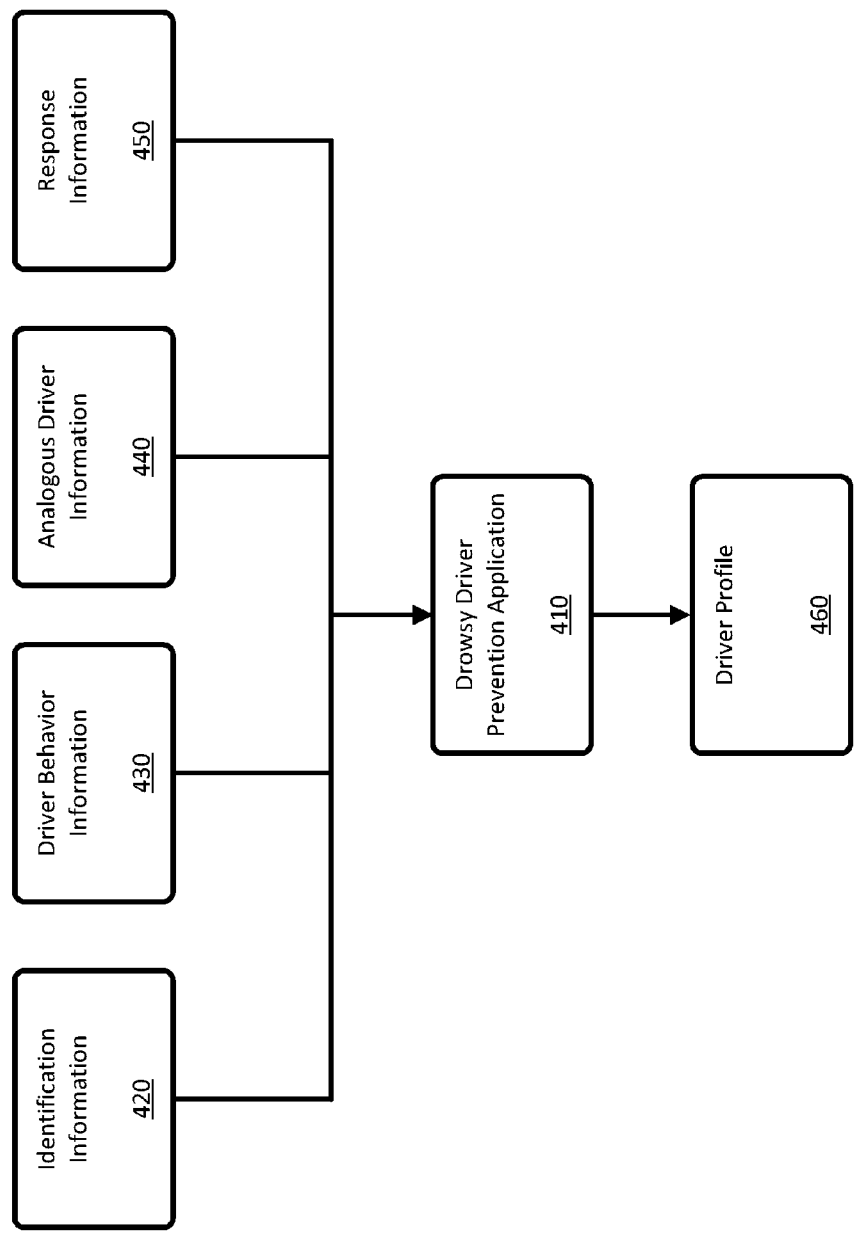
FIG. 4 illustrates a dataflow diagram of an example implementation for creating a driver profile.

FIG. 4 illustrates a dataflow diagram of an example implementation for creating (e.g., at block 310) a driver profile. As depicted, drowsy driver prevention application 410, which may be installed on user device 210, may receive one or more types of profile information, such as identification information 420, driver behavior information 430, analogous driver information 440, and response information 450, and/or may use the profile information to create and/or update a driver profile 460. The profile information 420-450 may be received by drowsy driver prevention application 410 at different times and from different sources.

For instance, when user device 210 initiates drowsy driver prevention application 410 for the first time, identification information 420, response information 450, and one or more other types of profile information (e.g., contact information, vehicle information, medical information, etc.) may be received from the user in order to create a driver profile initially. Some or all of the profile information received from the user may be sent to application server 220, and in response, analogous driver information 440 may be received from application server 220 to further enhance driver profile 460. Application server 220 may identify analogous drivers by identifying a similarity and/or a combination of similarities between two drivers. For instance, analogous drivers may be taking similar medications, have similar jobs, work hours, or schedules, may live and/or drive in similar geographic areas, may have similar ages, etc.

Driver behavior information may be received by drowsy driver prevention application 410 in response to collecting driving data while the user drives the vehicle, which may also, or alternatively, be used to enhance driver profile 460. If driver profile 460 is later modified (e.g., by receiving additional medical information, by receiving additional driver behavior information, etc.), drowsy driver prevention application 410 may update driver profile 460 by obtaining different and/or additional analogous driver information 440 from application server 220 since driver profile 460 may have become analogous to different drivers than was previously the case. As such, drowsy driver prevention application 410 may receive one or more types of profile information at one or more times and/or from one or more sources, resulting in a dynamically customized drive profile.

Referring back to FIG. 3, process 300 may include collecting driving data (block 320). For example, user device 210 may collect driving data. In some implementations, user device 210 may collect driving data from one or more sources, such as auxiliary device 230, position tracking server 240, vehicle control system 250, a radio or media device of the vehicle, a device connected to an on-board diagnostics (OBD) port of the vehicle, etc. Driving data may include one or more types of information relating to a driver driving a vehicle, such as a physical movement of the driver's body (e.g., movements of the head and neck of the driver) while driving the vehicle, whether the engine of the vehicle is running, whether the vehicle is moving or stationary, a distance that the driver has been driving, a duration that the driver has been driving (e.g., without turning the vehicle off and/or without stopping for at least a threshold amount of time), a route that the driver has been driving, media (e.g., songs, movies, television programs, etc.) that is being played by the vehicle, etc.

Figure 5A:
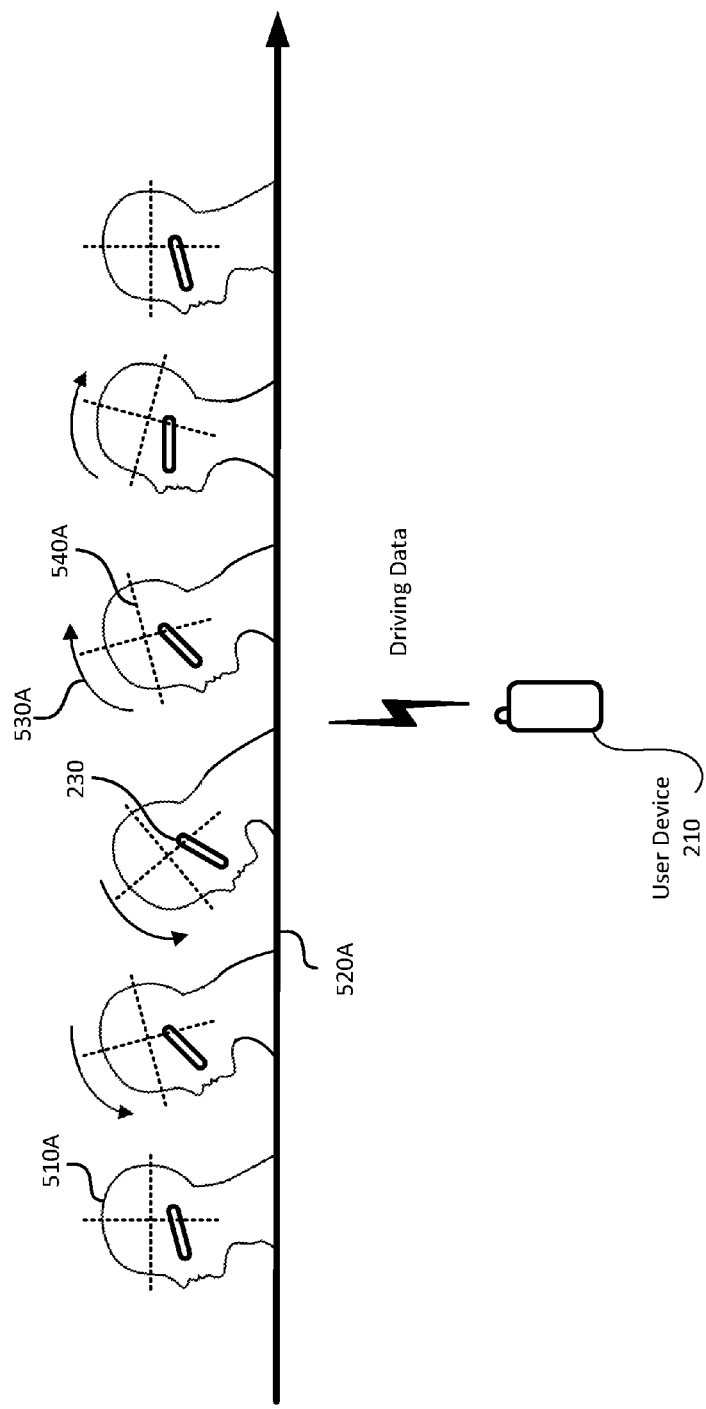
FIG. 5A illustrates an example implementation for collecting driving data from a profile view of a driver.

FIG. 5A illustrates an example implementation for collecting driving data from a profile view of a driver 510A. As shown, user device 210 may collect driving data from auxiliary device 230 in the form of vertical angular movements of the head and neck of driver 510A. For instance, as driver 510A becomes drowsy, the head of driver 510A may begin to pivot up and down in a pattern consistent with falling asleep while in a sitting position, as shown in FIG. 5A by changes in angular movement arrows 530A and reference grids 540A along timeline 520A. Such vertical angular movements may be detected by an accelerometer of auxiliary device 230 and/or another type of device, and collected by user device 210 as driving data. User device 210 may also, or alternatively, collect degree, time, frequency, and other types of information regarding vertical angular movements of the head and neck of driver 510A to, for example, help distinguish between whether driver 510A is falling asleep, listening to music, answering a question in the affirmative (e.g., communicating "yes" by nodding his or her head), etc. In some implementations, user device 210 may do so by comparing reference data (e.g., data that indicates motion associated with listening to music, nodding, etc.) against driving data from auxiliary device 230 that could be indicative of driver 510A falling asleep.

Figure 5B:
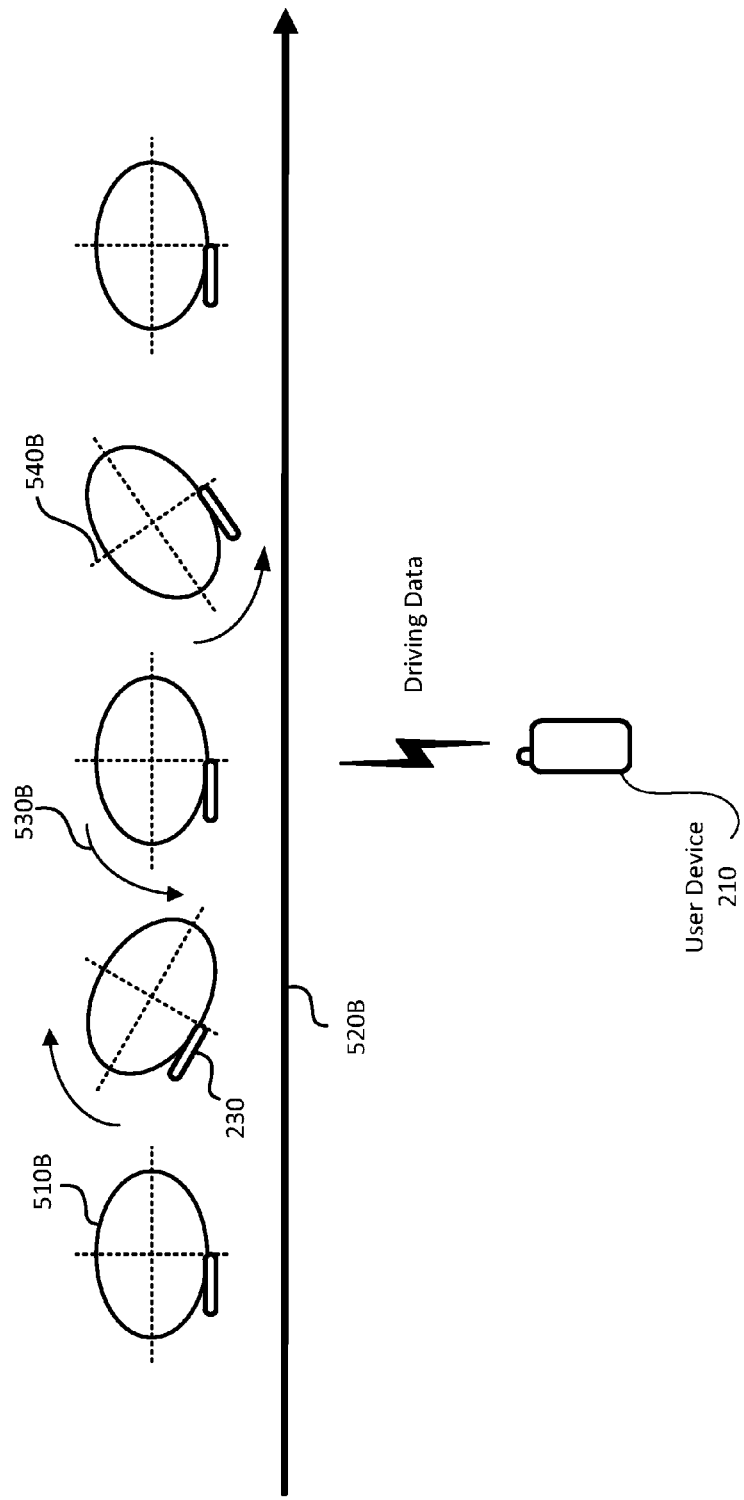
FIG. 5B illustrates an example implementation for collecting driving data from an overhead view of a driver.

FIG. 5B illustrates an example implementation for collecting driving data from an overhead view of a driver 510B. As shown, user device 210 may collect driving data from auxiliary device 230 in the form of horizontal angular movements of the head and neck of driver 510B, as shown in FIG. 5B by changes in angular movement arrows 530B and reference grids 540B along timeline 520B. In some implementations, driver 510B may attempt to thwart a sense of drowsiness by quickly shaking his or her head back and forth, by slapping himself or herself on the cheek (thereby causing a horizontal angular movement of the head), and/or in one or more other types of ways. Such horizontal angular movements may be detected by an accelerometer of auxiliary device 230 and/or another type of device, and collected by user device 210 as driving data. User device 210 may also, or alternatively, collect degree, time, frequency, and other types of information regarding horizontal angular movements of the head of driver 510B to, for example, help distinguish between whether driver 510B is falling asleep, answering a question in the negative (i.e., communicating "no" by nodding his or her head), etc. In some implementations, user device 210 may do so by comparing reference data (e.g., data that indicates motion associated with nodding one's head to communicate "no") against driving data from auxiliary device 230 that could be indicative of driver 510B falling asleep.

Figure 5C:
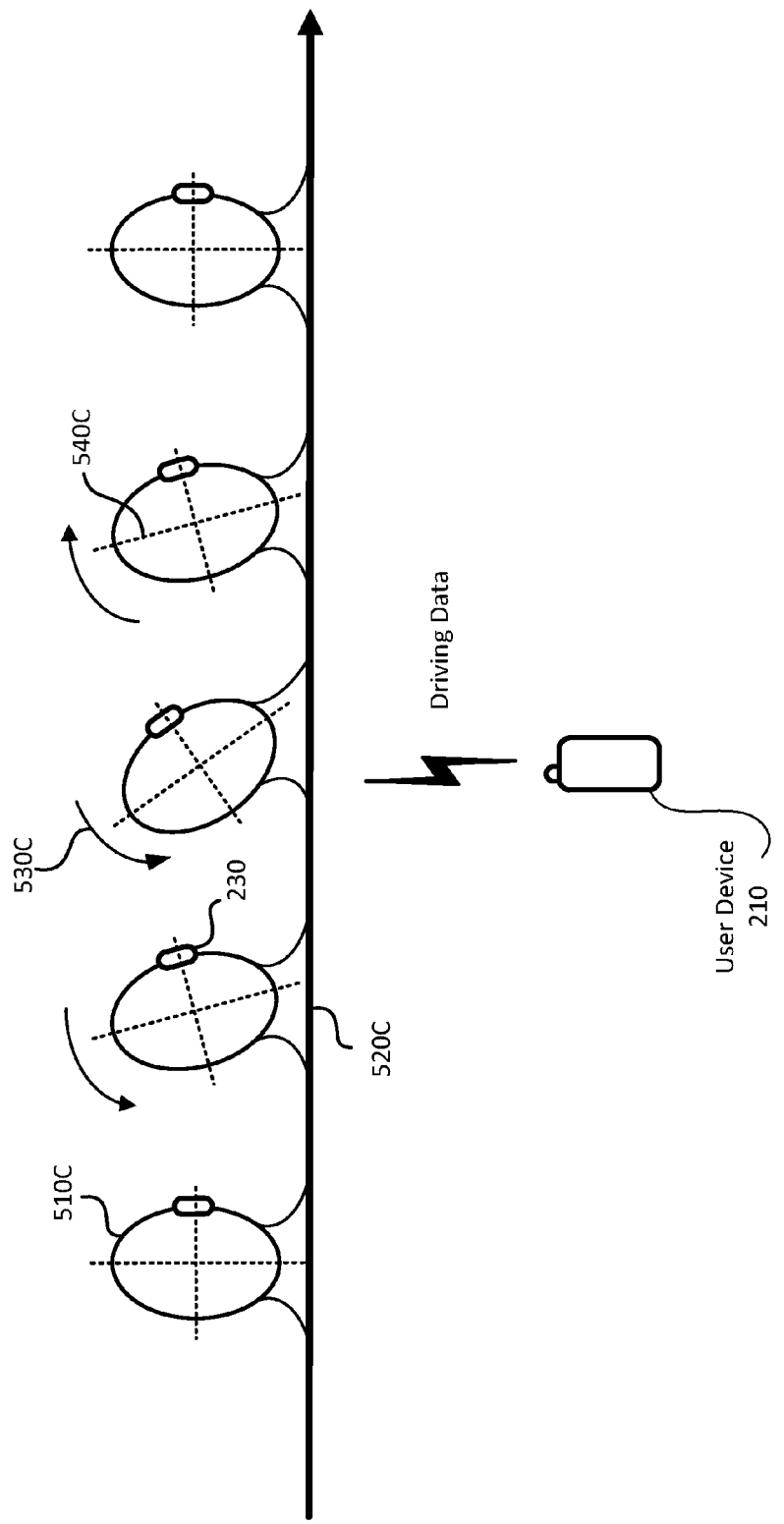
FIG. 5C illustrates an example implementation for collecting driving data from a front view of a driver.

FIG. 5C illustrates an example implementation for collecting driving data from a front view of a driver 510C. As shown, user device 210 may collect driving data from auxiliary device 230 in the form of lateral angular movements of the head and neck of driver 510C, as shown in FIG. 5C by changes in angular movement arrows 530C and reference grids 540C along timeline 520C. For instance, as driver 510C becomes drowsy, the head of driver 510C may begin to pivot laterally in a pattern consistent with falling asleep while in a sitting position. Lateral angular movements may be detected by an accelerometer of auxiliary device 230 and/or another type of device and collected by user device 210 as driving data. User device 210 may also, or alternatively, collect degree, time, frequency, and other types of information regarding lateral angular movements of the head of driver 510C to, for example, help distinguish between whether driver 510C is falling asleep, tilting his or her head while pondering a question, shrugging his or her shoulders and tiling his or her head in an "I don't know" gesture, etc. In some implementations, user device 210 may do so by comparing reference data (e.g., data that indicates motion associated with tiling one's head in an "I don't know" gesture) against driving data from auxiliary device 230 that could be indicative of driver 510C falling asleep.

Figure 6A:
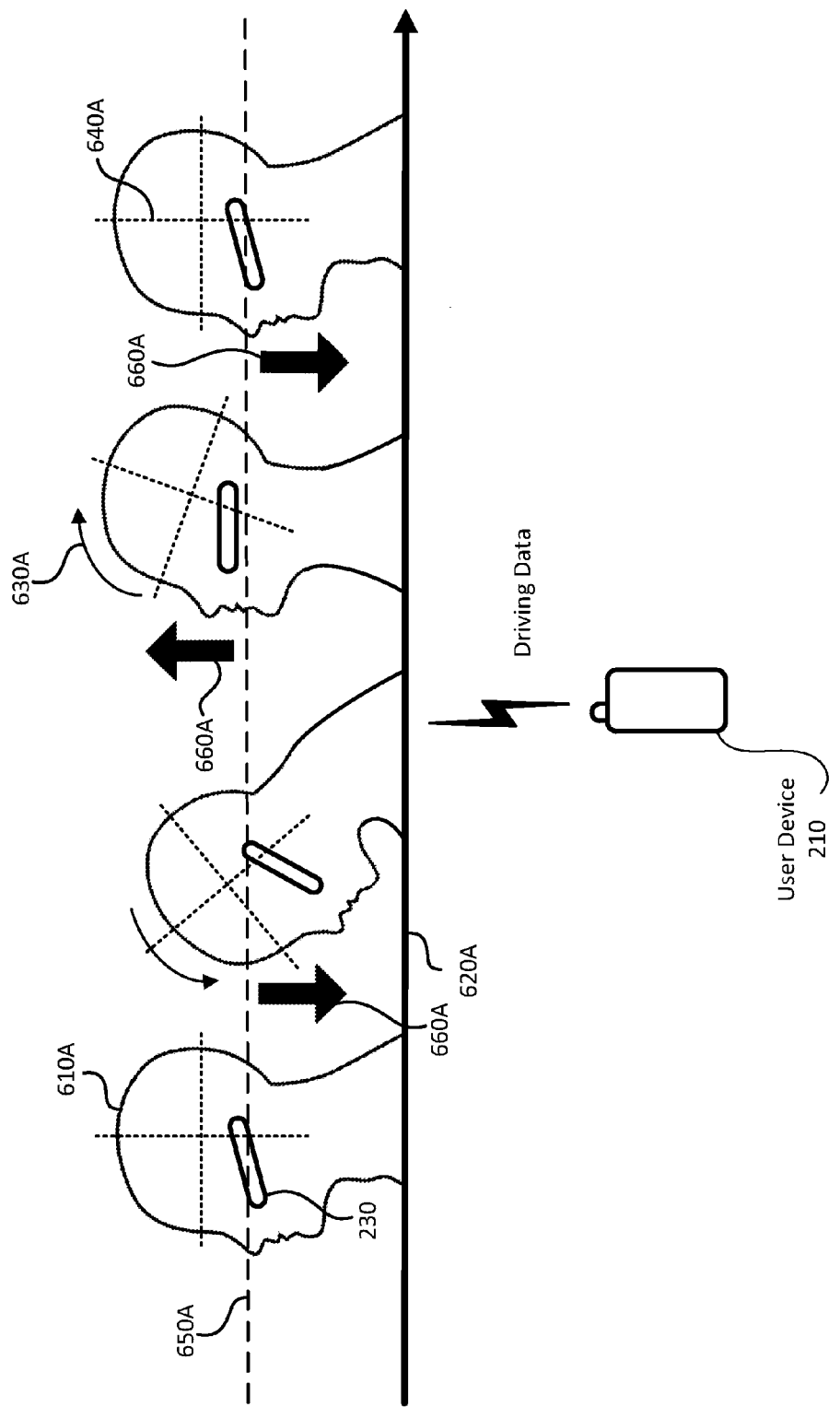
FIG. 6A illustrates an example implementation for collecting driving data from a profile view of a driver.

FIG. 6A illustrates an example implementation for collecting driving data from a profile view of a driver 610A. As shown, user device 210 may collect driving data from auxiliary device 230 in the form of a change in distance between user device 210 and auxiliary device 230. For instance, as driver 610A becomes drowsy, the head of driver 610B may begin to pivot vertically in a pattern consistent with falling asleep while in a sitting position, as shown in FIG. 6A by changes in angular movement arrows 630A and reference grids 640A along timeline 620A. As a result, a distance between user device 210 and auxiliary device 230 may change, as represented by changes in auxiliary device 230 and direction arrows 660A with respect to reference line 650A along timeline 620A. A change in distance between user device 210 and auxiliary device 230 may be collected, for example, by measuring the time required for a signal to be transmitted between user device 210 and auxiliary device 230, by measuring a signal strength between user device 210 and auxiliary device 230, and/or by one or more other types of distance measuring techniques. User device 210 may also, or alternatively, collect distance, time, frequency, and other types of information regarding changes in distance between user device 210 and auxiliary device 230 to, for example, help distinguish between whether driver 510A is falling asleep, listening to music, answering a question in the affirmative (e.g., communicating "yes"), etc.

Figure 6B:
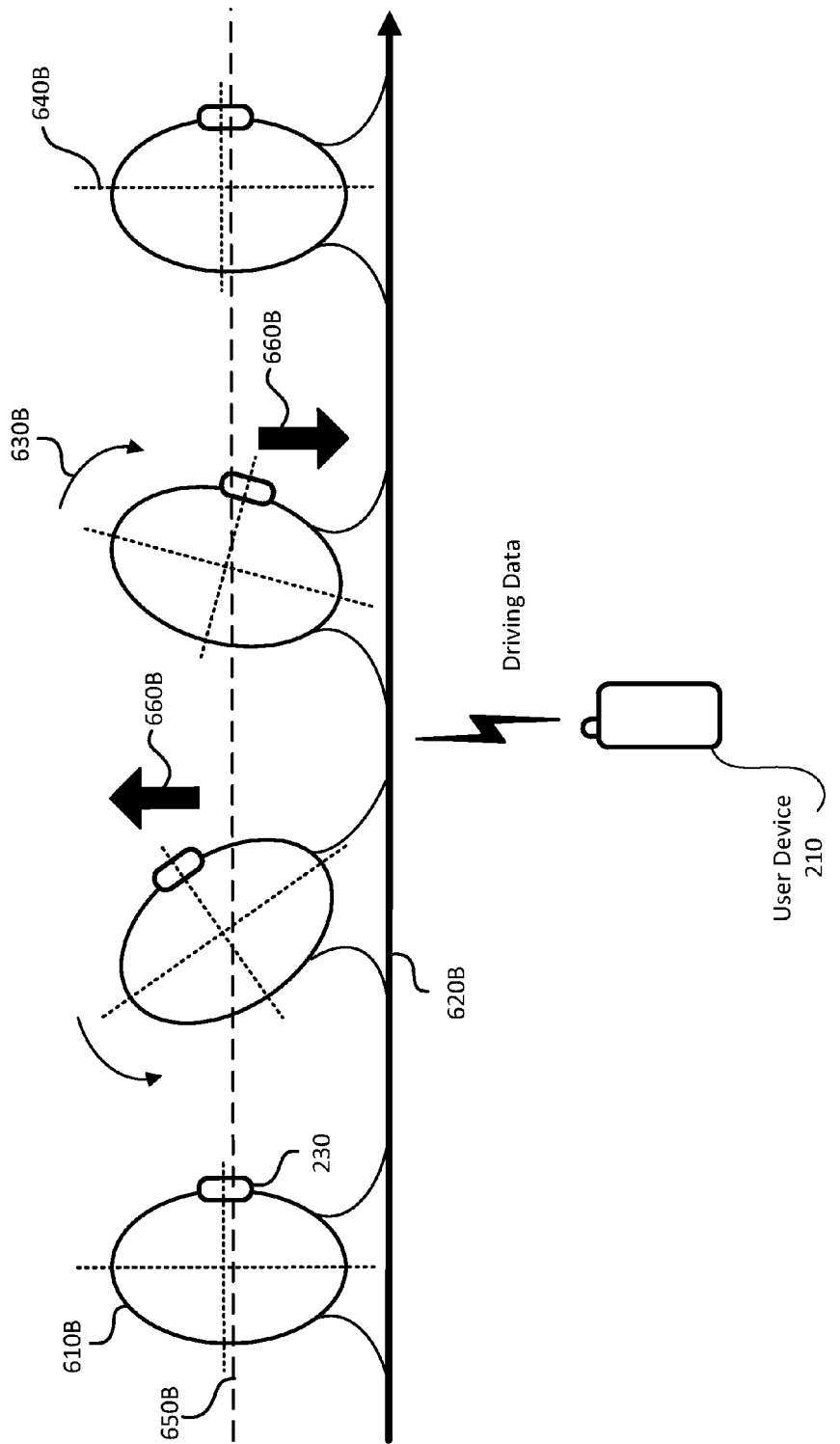
FIG. 6B illustrates an example implementation for collecting driving data from a front view of a driver.

FIG. 6B illustrates an example implementation for collecting driving data from a front view of a driver 610B. As shown, user device 210 may collect driving data from auxiliary device 230 in the form of a change in distance between user device 210 and auxiliary device 230. For instance, as driver 610B becomes drowsy, the head of driver 610B may begin to pivot laterally in a pattern consistent with falling asleep while in a sitting position, as shown in FIG. 6B by changes in angular movement arrows 630B and reference grids 640B along timeline 620AB. As a result, a distance between user device 210 and auxiliary device 230 may change, as represented by changes in auxiliary device 230 and direction arrows 660B with respect to reference line 650B along timeline 620B. As mentioned above, a change in distance between user device 210 and auxiliary device 230 may be collected, for example, by measuring the time required for a signal to be transmitted between user device 210 and auxiliary device 230, by measuring a signal strength between user device 210 and auxiliary device 230, and/or by one or more other types of distance measuring techniques. User device 210 may also, or alternatively, collect distance, time, frequency, and other types of information regarding changes in distance between user device 210 and auxiliary device 230 to, for example, help distinguish between whether driver 610A is falling asleep, tilting his or her head while pondering a question, shrugging his or her shoulders and tiling his or her head in an "I don't know" gesture, etc.

Referring again to FIG. 3, process 300 may include analyzing driving data to determine whether a driver 510 is drowsy (block 330). For example, user device 210 may analyze driving data to determine whether driver 510 is drowsy. In some implementations, user device 210 may implement one or more of a variety of techniques for analyzing driving data to determine whether driver 510 is drowsy.

For example, user device 210 may define a drowsiness threshold based on one or more aspects of driver profile 460 and/or one or more types of driving data (e.g., whether the driver has a general propensity to drive while drowsy, whether the driver is driving at a time, for a duration, and/or along a particular route where the driver and/or analogous drivers have experienced drowsiness before, types of medical conditions associated with the driver, types of medication the driver is taking, what type of media is being played by the vehicle (e.g., a drowsiness threshold based on vertical angular movement of the head of driver 510 may be greater if driver 510 is listening to a type of music, such as rock and roll, where a listener commonly moves his or her head in a vertical angular movement along with a rhythm of the music), the physical movement of the driver's body (e.g., vertical, horizontal, and lateral angular movements of the head and neck of the driver), changes in the distance between user device 210 and auxiliary device 230, etc.), and determine that the driver is drowsy when recently collected driving data exceeds the drowsiness threshold. Additionally, or alternatively, user device 210 may define drowsiness thresholds for different aspects of driver profile 460 and/or one or more types of driving data, and determine that a driver is drowsy when profile 460 and recently collected driving data exceed all, a pre-selected percentage, a pre-selected number of the drowsiness thresholds, and/or a pre-selected combination of drowsiness thresholds. In some implementations, user device 210 may also use one or more default settings when defining a drowsiness threshold and comparing driving data to the drowsiness threshold.

In some implementations, user device 210 may define drowsiness thresholds for different levels of confidence with respect to the driver being drowsy. For instance, user device 210 may define a drowsiness threshold that corresponds to merely being suspicious that a driver is drowsy and another drowsiness threshold for being certain that the driver is drowsy. In such implementations, defining drowsiness thresholds for different levels of confidence may, for example, enable user device 210 to customize responses to drowsy driver behavior according to the levels of confidence of the driver actually being drowsy. For example, when user device 210 is merely suspicious of driver 510 being drowsy, user device 210 may provide an audio message prompting driver 510 to state whether he or she is drowsy; however, when user device 210 is certain of driver 510 being drowsy, user device 210 may provide an audio message stating that driver 510 should drive to a rest area and/or provide driver 510 with directions to the rest area. Drowsiness thresholds may be defined using one or more quantitative and/or qualitative measurement techniques, which may be implemented using one or more indexing techniques for each type of information upon which a drowsiness threshold is based. As such, user device 210 may analyze driving data to determine whether driver 510 is drowsy in one or more of a variety of ways.

Figure 7:
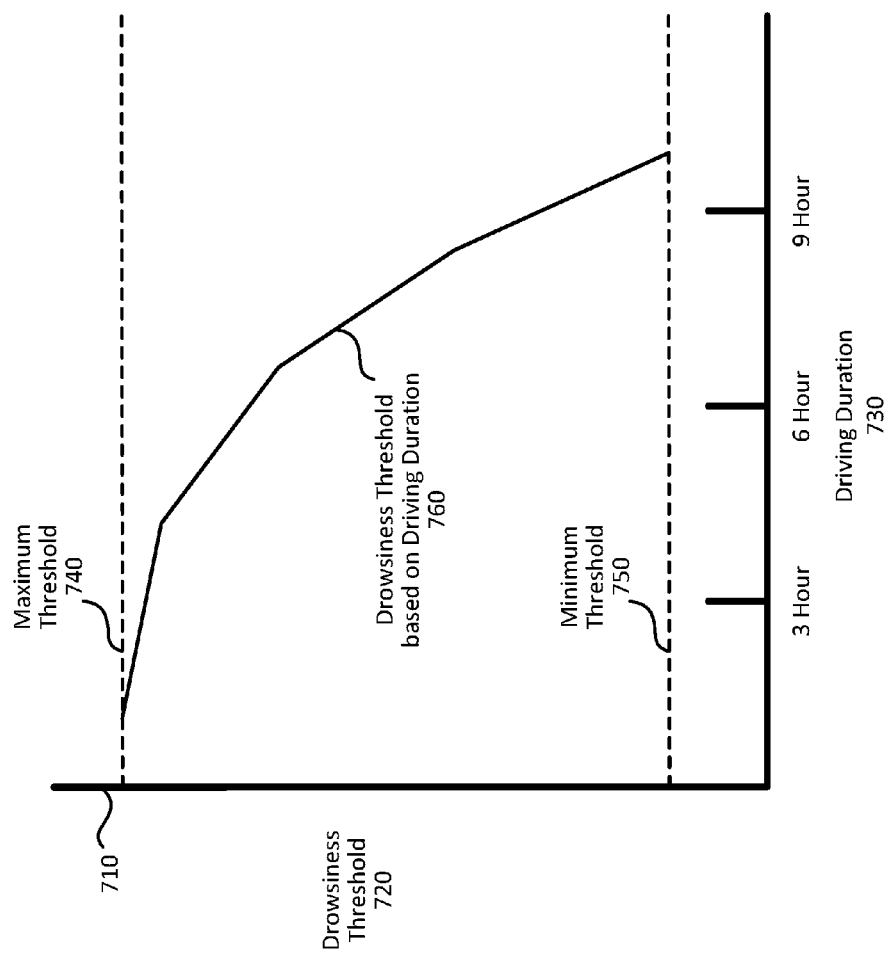
FIG. 7 illustrates an example representation of drowsiness thresholds that may vary over time in determining whether a driver is drowsy.

FIG. 7 illustrates an example representation of drowsiness thresholds that may vary over time in determining whether driver 510 is drowsy. As show in FIG. 7, representation may include a table 710 that includes a vertical axis of drowsiness thresholds values 720, a horizontal axis of driving duration values 730, a maximum threshold 740, a minimum threshold 750, and a line indicating a relationship between drowsiness threshold and driving duration 760.

Drowsiness threshold values 720 may include thresholds ranging from minimum threshold 750 to maximum threshold 740. For instance, significant angular movements of a driver's head and/or with significant changes in the distance between user device 210 and auxiliary device 230 may be required to exceed maximum threshold 740, while lesser angular movements and/or distances between user device 210 and auxiliary device 230 may be required to exceed minimum threshold 750. As indicated by the relationship between drowsiness threshold and driving duration 760, the particular drowsiness threshold values 720 applied to a given scenario may change based on one or more other factors, such as driving duration values 730 (e.g., the amount of time that a driver has been driving continuously). For instance, as shown in FIG. 7, the drowsiness threshold values 720 applied to a driver that has just begun to drive may be much greater than the drowsiness threshold values 720 applied to the driver after several hours of driving.

Drowsiness threshold values 720 may be reduced under one or more conditions. For instance, the particular driver threshold value 720 applied to driver 510 after several hours of driving may be reduced based on an amount of time that driver 510 has rested. If driver 510 takes a short break (e.g., 30 minutes) after driving for several hours, the drowsiness threshold value 720 applied to driver 510 may be reduced from a higher drowsiness threshold value 720 to a lower drowsiness threshold value (e.g., half the higher drowsiness threshold value 720); however, if driver 510 takes a long break (e.g., 2 hours) after driving for several hours, the drowsiness threshold value 720 may be fully reset. The amount of adjustment applied to a particular drowsiness threshold 720 may depend on a ratio of the duration for which 510 was driving and a duration for which driver 510 has rested.

As mentioned above, angular movements of a driver's head and distances between user device 210 and auxiliary device 230 may be used to determine whether a driver is drowsy. However, in some implementations, one or more types of angular movement may be given greater weight or consideration than one or more other types of angular movement. For instance, vertical angular movements of a driver's head may be give greater consideration when determining whether the driver is drowsy than horizontal or lateral angular movements.

Additionally, or alternatively, certain angular movements may be given greater when in combination with other factors, such as significant changes in the distance between user device 210 and auxiliary device 230. For example, lateral angular movements may be given greater consideration in determining whether a driver is drowsy when detected in combination with a significant (and/or prolonged) reduction in the distance between user device 210 and auxiliary device 230, indicating that the lateral angular movement of the driver's head is more likely to be an indication of sleepiness and less likely to be an indication of a simple gesture. Furthermore, a change in distance between user device 210 and auxiliary device 230 associated with one type of angular movement (See, e.g., vertical angular movement of FIG. 6A) may be given greater consideration in determining drowsiness than a change in distance between user device 210 and auxiliary device 230 associated with another type of angular movement (See, e.g., lateral angular movement of FIG. 6B).

Referring back to FIG. 3, process 300 may include responding to a driving data analysis (bock 340). For example, user device 210 may respond to a driving data analysis. In some implementations, user device 210 may respond in one or more of a variety of ways, such as alerting driver 510 with an audio signal, providing directions to a nearby rest stop, activating a braking system of the vehicle, activating a radio or other media device of the vehicle, communicating a warning to other drivers that driver 510 in their vicinity is driving while drowsy, contacting a guardian, an emergency contact, an employer, and/or law enforcement, etc. In some implementations, user device 210 may respond to driver 510 being drowsy based user profile 460. User device 210 may also, or alternatively, respond to driver 210 being drowsy based on one or more default settings of drowsy driver prevention application 410.

In some implementations, user device 210 may respond to driver 510 being drowsy by prompting the driver to verify whether or not he or she is actually drowsy. In some implementations, this may include prompting the user to input a voice command or press a button of user device 210 and/or a button of the vehicle. This may also, or alternatively, include prompting the user to answer one or more questions, solve a riddle, complete a puzzle, or perform another type of challenge as evidence that the driver is not drowsy. In such implementations, when driver 510 fails to respond to such a prompt or fails to respond correctly, user device 210 may determine that driver 510 is drowsy and respond accordingly.

In some implementations, user device 210 may respond to a driving data analysis by collecting driving data (See, block 320). For example, if user device 210 analyzes driving data for a driver and determines that the driver is not drowsy, user device 210 may respond to the analysis of the driving data by continuing to collect driving data. User device 210 may also, or alternatively, respond to a driving data analysis by continuing to collect driving data when the driving data analysis shows that the driver is drowsy. As mentioned above, collected driving data, driving data analyses, and/or responses to driving data analyses may be used to update driver profile 460 and/or sent to application server 220 to create and update user profiles 460 of analogous drivers.

Figure 8:
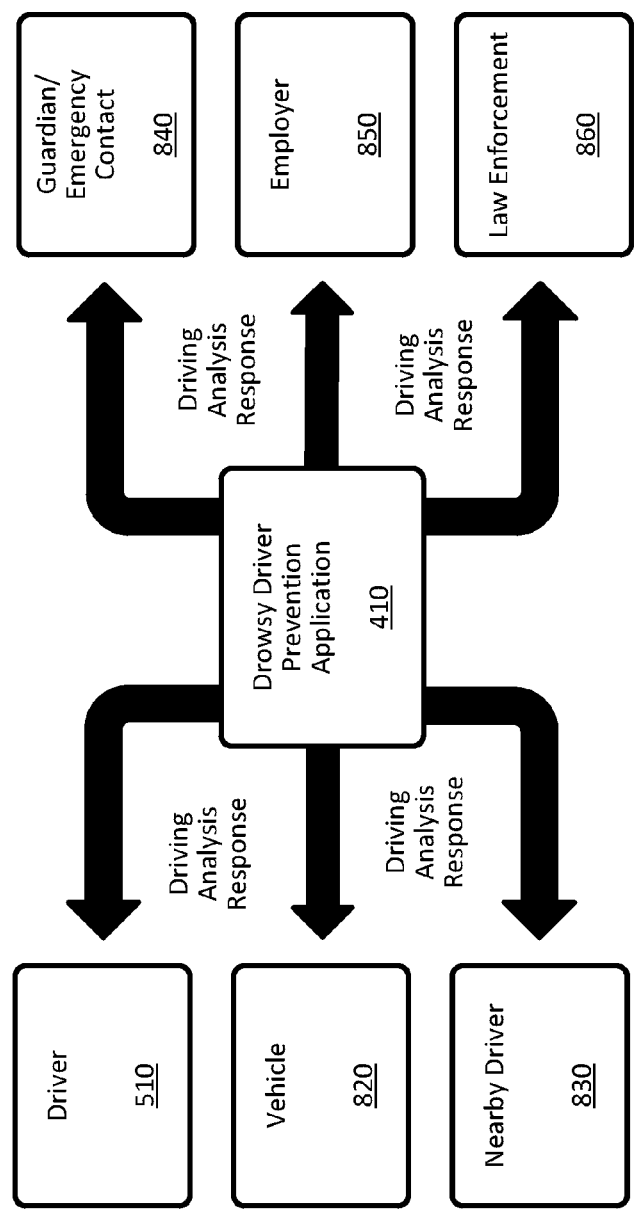
FIG. 8 illustrates an example implementation for responding to a driving data analysis.

FIG. 8 illustrates an example implementation for responding to a driving data analysis. As shown user device 410 may respond to a driving data analysis by communicating a driving analysis response to one or more entities (e.g., driver 510, vehicle 820, nearby driver 830, guardian/emergency contact 840, employer 850, employer 860, etc.). A driving analysis response may include one or more types of operations, such as alerting driver 510 with an audio signal, activating assisted driving feature of vehicle 820, prompting driver 510 to verify whether or not he or she is actually drowsy, providing driver 510 directions to a nearby rest stop, communicating to vehicle 820 to activate a braking system of vehicle 820, activating a radio or other media device of the vehicle 820, communicating a warning to one or more nearby drivers 830, contacting guardian/emergency contact 840 of driver 510, notifying employer 850 that driver 510 is driving while drowsy, notifying law enforcement 860 that driver 510 is driving drowsy, etc. Depending on the implementation, a driving analysis response may include one or more types of communications, such as an audio signal, a telephone call, a text message, an email, a voicemail, etc. Additionally, or alternatively, a driving analysis response may include one or more types of information, such as an alarm, prerecorded audio signal, a written message, a description of the geographic location of vehicle 820, etc.

In some implementations, a driving analysis response may include enabling a guardian, employer, or other entity to contact driver 510 and/or vehicle 820. Doing so may enable guardian 840, employer 850, or law enforcement 860 to, for example, speak with driver 510 to verify whether driver 510 is drowsy, to convince driver 510 to pull over or drive to a rest stop, etc. Additionally, or alternatively, doing so may enable guardian 840, employer 850, or law enforcement 860 to exercise control over vehicle 820 to, for example, activate the braking system of vehicle 820, turn off the engine of vehicle 820, etc. As such, drowsy driver prevention application 410 may enable user device 210 to respond to a driving data analysis in one or more of a large variety of ways to prevent a driver from driving while drowsy.

As described above, FIGS. 4-8 provide example implementations of operations shown in FIG. 3. It should be noted, however, that while FIG. 3 shows a flowchart diagram of an example process 300 for implementing a conference call, in other implementations, a process for implementing a conference call may include fewer operations, different operations, differently arranged operations, and/or additional operations than depicted in FIG. 3. Similarly, while FIGS. 4-8 show example implementations with various features, in other implementations, example implementations may include fewer features, different features, differently arranged features, and/or additional features than the features depicted in FIGS. 4-8.

Figure 9:
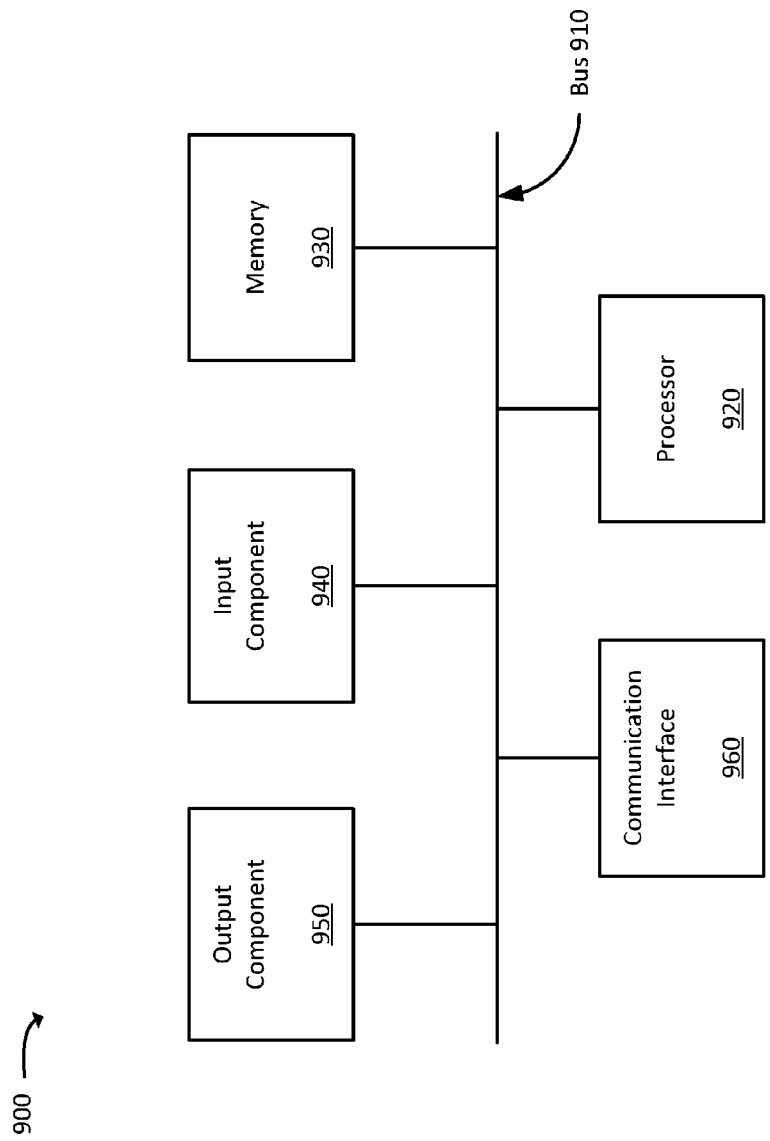
FIG. 9 illustrates example components of one or more devices, according to one or more implementations described herein.

FIG. 9 is a diagram of example components of device 900. One or more of the devices described above (e.g., with respect to FIGS. 1, 2, and 5A-6B) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes (LEDs), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIG. 3, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIG. 2), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms; depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   collecting, by a user device, driving data corresponding to a driver of a vehicle, the driving data comprising movement information associated with a head of the driver while driving the vehicle and a duration the driver has been continuously driving the vehicle, the movement information associated with the head of the driver comprising angular movement information from an auxiliary device attached to the head of the driver;
   creating a driver profile, the driver profile comprising driver behavior information comprising data of the driver driving the vehicle on a previous occasion, analogous driver information comprising data of at least one other driver analogous to the driver in at least one way driving at least one other vehicle, and response information comprising instructions for responding to the analyzing of the driving data,
   analyzing, by the user device, the driving data to determine whether the driver is drowsy by comparing the driving data to a drowsiness threshold,
   wherein the analyzing of the driving data is based on the collected driving data, the driver behavior information of the driver profile, and the analogous driver information of the driver profile; and
   responding, by the user device, to the analyzing of the driving data by alerting the driver of the vehicle when the driver is drowsy,
   wherein the responding to the analyzing of the driving data is based on the response information of the driver profile.

2. The method of claim 1, wherein the collecting of the movement information associated with the head of the driver comprises collecting angular movement information from an accelerometer associated with the auxiliary device attached to the head of the driver.

3. The method of claim 1, wherein the driving data comprises angular movement of the head of the driver and a change in distance between the user device and an auxiliary device of the user device, the change in distance between the user device and the auxiliary device coinciding with the angular movement of the head of the driver, and
   the analyzing of the driving data to determine whether the driver is drowsy comprises analyzing the angular movement of the head of the driver in combination with the change in distance between the user device and the auxiliary device.

4. The method of claim 3, wherein the angular movement of the head of the driver comprises at least one of a vertical angular movement of the head of the driver, a horizontal angular movement of the head of the driver, or a lateral angular movement of the head of the driver, and
   wherein the analyzing of the driving data to determine whether the driver is drowsy comprises determining whether the angular movement of the head of the driver corresponds to vertical angular movement, horizontal angular movement, or lateral angular movement.

5. The method of claim 1, wherein the drowsiness threshold is based on at least one of:
   whether the driver has driven while drowsy before,
   whether the driver is driving at a time when the driver has previously driven while drowsy,
   whether the duration for which the driver has been continuously driving is greater than or equal to a driving duration associated with the driver being drowsy previously,
   whether the driver is driving along a route where the driver has previously experienced drowsiness,
   whether the driver is taking medication associated with drowsiness,
   whether the driver has a medical condition associated with drowsiness,
   whether the driver is driving along a route associated with other drivers driving while drowsy, and
   whether the duration for which the driver has been driving is greater than or equal to a driving duration associated with other drivers being drowsy.

6. The method of claim 1, wherein the responding to the analyzing of the driving data when the driver is drowsy comprises at least one of:
   communicating with the vehicle to activate a braking system of the vehicle,
   communicating with the vehicle to turn off an engine of the vehicle,
   providing the driver with directions to a nearby rest area,
   warning drivers of other vehicles that the driver is drowsy,
   contacting a guardian of the driver about the driving being drowsy,
   contacting an employer of the driver about the driving being drowsy, or
   contacting local law enforcement about the driving being drowsy.

7. The method of claim 1, wherein the analyzing of the driving data to determine whether the driver is drowsy comprises prompting the driver to complete a challenge and determining whether the driver completes the challenge successfully.

8. A system, comprising:
   a user device, comprising:
      a non-transitory memory device storing:
         a plurality of processor-executable instructions; and
         a processor configured to execute the processor-executable instructions, wherein executing the processor-executable instructions causes the processor to:
            collect driving data corresponding to a driver of a vehicle, the driving data comprising movement information associated with a head of the driver while driving the vehicle and a duration the driver has been continuously driving the vehicle, the movement information associated with the head of the driver comprising angular movement information from an auxiliary device attached to the head of the driver, create a driver profile, the driver profile comprising driver behavior information comprising data of the driver driving the vehicle on a previous occasion, analogous driver information comprising data of at least one other driver analogous to the driver driving at least one other vehicle, and response information comprising instructions for responding to the driving data, perform a driving data analysis based on the driving data to determine whether the driver is drowsy by comparing the driving data to a drowsiness threshold, wherein the driving data analysis is based on the collected driving data, the driver behavior information of the driver profile, and the analogous driver information of the driver profile, and respond to the driving data analysis by alerting the driver of the vehicle when the driver is drowsy, wherein the response to the driving data analysis is based on the response information of the driver profile.

9. The system of claim 8, executing the processor-executable instructions, to collect movement information associated with the head of the driver, causes the processor to:

collect angular movement information from an accelerometer associated with the auxiliary device attached to the head of the driver.

10. The system of claim 8, wherein the driving data comprises angular movement of the head of the driver and a change in distance between the user device and an auxiliary device of the user device, the change in distance between the user device and the auxiliary device coinciding with the angular movement of the head of the driver, and the driving data analysis comprises an analysis of the angular movement of the head of the driver in combination with the change in distance between the user device and the auxiliary device.

11. The system of claim 10, wherein the angular movement of the head of the driver comprises at least one of a vertical angular movement of the head of the driver, a horizontal angular movement of the head of the driver, or a lateral angular movement of the head of the driver, and wherein the driving data analysis comprises a determination of whether the angular movement of the head of the driver corresponds to vertical angular movement, horizontal angular movement, or lateral angular movement.

12. The system of claim 8, wherein the drowsiness threshold is based on at least one of:

whether the driver has driven while drowsy previously, whether the driver is driving at a time when the driver has previously driving while drowsy, whether the duration for which the driver has been continuously driving is greater than or equal to a driving duration associated with the driver being drowsy previously, whether the driver is driving along a route where the driver has previously experienced drowsiness, whether the driver is taking medication associated with drowsiness, whether the driver has a medical condition associated with drowsiness, whether the driver is driving along a route associated with other drivers driving while drowsy, and whether the duration for which the driver has been driving is greater than or equal to a driving duration associated with other drivers being drowsy.

13. The system of claim 8, wherein executing the processor-executable instructions, to respond to the driving data analysis when the driver is drowsy, causes the processor perform at least one of:

communicate with the vehicle to activate a braking system of the vehicle, communicate with the vehicle to turn off an engine of the vehicle, provide the driver with directions to a nearby rest area, warn drivers of other vehicles that the driver is drowsy, contact a guardian of the driver about the driving being drowsy, contact an employer of the driver about the driving being drowsy, or contact local law enforcement about the driving being drowsy.

14. The system of claim 8, wherein executing the processor-executable instructions, to perform the driving data analysis, causes the processor to:

determine whether the driver is drowsy by prompting the driver to complete a challenge and determining whether the driver completes the challenge successfully.

15. A non-transitory computer-readable medium for storing instructions, the instructions comprising:

a plurality of instructions which, when executed by one or more processors associated with a device, cause the one or more processors to:

create a driver profile, the driver profile comprising driver behavior information comprising data of a driver driving a vehicle on a previous occasion, analogous driver information comprising data of at least one other driver analogous to the driver driving at least one other vehicle, and response information comprising instructions for responding to driving data analyses, collect driving data corresponding to the driver of the vehicle, driving data comprising movement information associated with a head of the driver while driving the vehicle, perform a driving data analysis based on the driving data, the driver behavior information of the driver profile, and the analogous driver information of the driver profile to determine whether the driver is drowsy, and respond to the driving data analysis based on the response information of the driver profile when the driver is drowsy and by collecting additional driving data when the driver is not drowsy.

16. The non-transitory computer-readable medium of claim 15, wherein, to collect movement information associated with a head of the driver, one or more instructions, of the plurality of instructions, causes the one or more processors to:

collect angular movement information from an auxiliary device attached to the head of the driver.

17. The non-transitory computer-readable medium of claim 15, wherein the driving data comprises angular movement of the head of the driver, a change in distance between the user device and an auxiliary device of the user device, and a duration the driver has been continuously driving the vehicle, the change in distance between the user device and the auxiliary device coinciding with the angular movement of the head of the driver, and the driving data analysis comprises an analysis of the angular movement of the head of the driver in combination with the change in distance between the user device and the auxiliary device and the duration the driver has been continuously driving the vehicle.

18. The non-transitory computer-readable medium of claim 15, wherein, to respond to the driving data analysis when the driver is drowsy, causes the processor perform at least one of:
- communicate with the vehicle to activate a braking system of the vehicle,
- communicate with the vehicle to turn off an engine of the vehicle,
- provide the driver with directions to a nearby rest area,
- warn drivers of other vehicles that the driver is drowsy,
- contact a guardian of the driver about the driving being drowsy,
- contact an employer of the driver about the driving being drowsy, or
- contact local law enforcement about the driving being drowsy.

19. The non-transitory computer-readable medium of claim 15, wherein, to respond to the driving data analysis when the driver is drowsy, one or more instructions, of the plurality of instructions, causes the one or more processors to perform at least one of:
- communicate with the vehicle to activate a braking system of the vehicle,
- communicate with the vehicle to turn off an engine of the vehicle,
- provide the driver with directions to a nearby rest area,
- warn drivers of other vehicles that the driver is drowsy,
- contact a guardian of the driver about the driving being drowsy,
- contact an employer of the driver about the driving being drowsy, or
- contact local law enforcement about the driving being drowsy.

20. The non-transitory computer-readable medium of claim 15, wherein, to perform the driving data analysis, one or more instructions, of the plurality of instructions, causes the one or more processors to:
- determine whether the driver is drowsy by prompting the driver to complete a challenge and determining whether the driver completes the challenge successfully.

* * * * *